(12) United States Patent
Bradley

(10) Patent No.: US 10,984,125 B2
(45) Date of Patent: Apr. 20, 2021

(54) PROTECTING DATA OF A PARTICULAR TYPE

(71) Applicant: ENTIT SOFTWARE LLC, Sanford, NC (US)

(72) Inventor: Matthew Bradley, Bracknell (GB)

(73) Assignee: MICRO FOCUS LLC, Santa Clara, CA (US)

( * ) Notice: Subject to any disclaimer, the term of this patent is extended or adjusted under 35 U.S.C. 154(b) by 192 days.

(21) Appl. No.: 16/070,655

(22) PCT Filed: Jan. 25, 2016

(86) PCT No.: PCT/US2016/014744
§ 371 (c)(1),
(2) Date: Jul. 17, 2018

(87) PCT Pub. No.: WO2017/131615
PCT Pub. Date: Aug. 3, 2017

(65) Prior Publication Data
US 2019/0057222 A1    Feb. 21, 2019

(51) Int. Cl.
*G06F 21/62* (2013.01)
*G06F 21/60* (2013.01)

(52) U.S. Cl.
CPC .......... *G06F 21/6227* (2013.01); *G06F 21/60* (2013.01); *G06F 21/602* (2013.01); *G06F 21/6218* (2013.01)

(58) Field of Classification Search
CPC .... G06F 21/6227; G06F 21/60; G06F 21/602; G06F 21/6218
See application file for complete search history.

(56) References Cited

U.S. PATENT DOCUMENTS

| 7,320,069 | B1 | 1/2008 | Sundharraj |
| 7,809,698 | B1 * | 10/2010 | Salz ..................... G06F 21/6227 707/694 |
| 8,897,451 | B1 * | 11/2014 | Salvaji .................. H04L 9/0894 380/277 |
| 8,955,042 | B2 | 2/2015 | Shea et al. |
| 8,990,266 | B2 | 3/2015 | Shea et al. |
| 9,177,174 | B1 * | 11/2015 | Shoemaker ............. H04L 63/08 |

(Continued)

OTHER PUBLICATIONS

International Searching Authority, International Report and Written Opinion dated Dec. 22, 2016 for PCT Application No. PCT/US2016/014744 Filed Jan. 25, 2016, 16 pages.

(Continued)

*Primary Examiner* — Vance M Little

(57) ABSTRACT

Example implementations relate to protecting data of a particular data type. For example, a system for protecting data of a particular type may include a configuration engine to receive a stream of data, where a portion of the stream of data includes data of a particular data type. The configuration engine may determine the particular data type to be protected based, at least in part, on a format associated with the stream of data. Further, the system for protecting data of a particular type may include a cryptography engine to protect the data of the particular data type, and a generation engine to output the stream of data such that at least the data of the particular data type is protected.

20 Claims, 2 Drawing Sheets

(56) References Cited

U.S. PATENT DOCUMENTS

| | | | |
|---|---|---|---|
| 2003/0101145 A1* | 5/2003 | Fang | G06Q 20/382 705/64 |
| 2007/0101123 A1 | 5/2007 | Kollmyer | |
| 2008/0263645 A1* | 10/2008 | Renter | G06F 21/6245 726/6 |
| 2012/0020475 A1 | 1/2012 | Altmann | |
| 2012/0221466 A1* | 8/2012 | Look | G06Q 20/20 705/39 |
| 2012/0239540 A1* | 9/2012 | Rogers, Jr. | H04W 12/12 705/35 |
| 2013/0089098 A1* | 4/2013 | Mital | H04L 69/22 670/394 |
| 2013/0167192 A1* | 6/2013 | Hickman | G06F 21/60 726/1 |
| 2013/0346412 A1 | 12/2013 | Raichelgauz | |
| 2014/0041018 A1* | 2/2014 | Bomar | G06Q 20/385 726/18 |
| 2014/0150060 A1 | 5/2014 | Riley | |
| 2014/0365372 A1 | 12/2014 | Ross et al. | |
| 2015/0310087 A1 | 10/2015 | Tidwell et al. | |
| 2015/0350486 A1* | 12/2015 | Kim | H04N 1/32277 382/100 |
| 2016/0019396 A1* | 1/2016 | Davis | H04L 63/0807 713/193 |

OTHER PUBLICATIONS

Pramanick, S., Addressing the Big Data Security!, Sep. 5, 2013, Hadoop: The Big Data Institute, 11 pages.

Unknown, Example Use Cases, Apr. 17, 2015, Velocidata, Inc., 11 pages.

Unknown, Streamlining Information Protection Through a Data-centric Security Approach, May 10, 2013, White Paper, Voltage Security, Inc. 13 pages.

Unknown, Understanding and Selecting Data Masking Solutions: Creating Secure and Useful Data, Aug. 10, 2012, Securosis, LLC, 33 pages.

\* cited by examiner

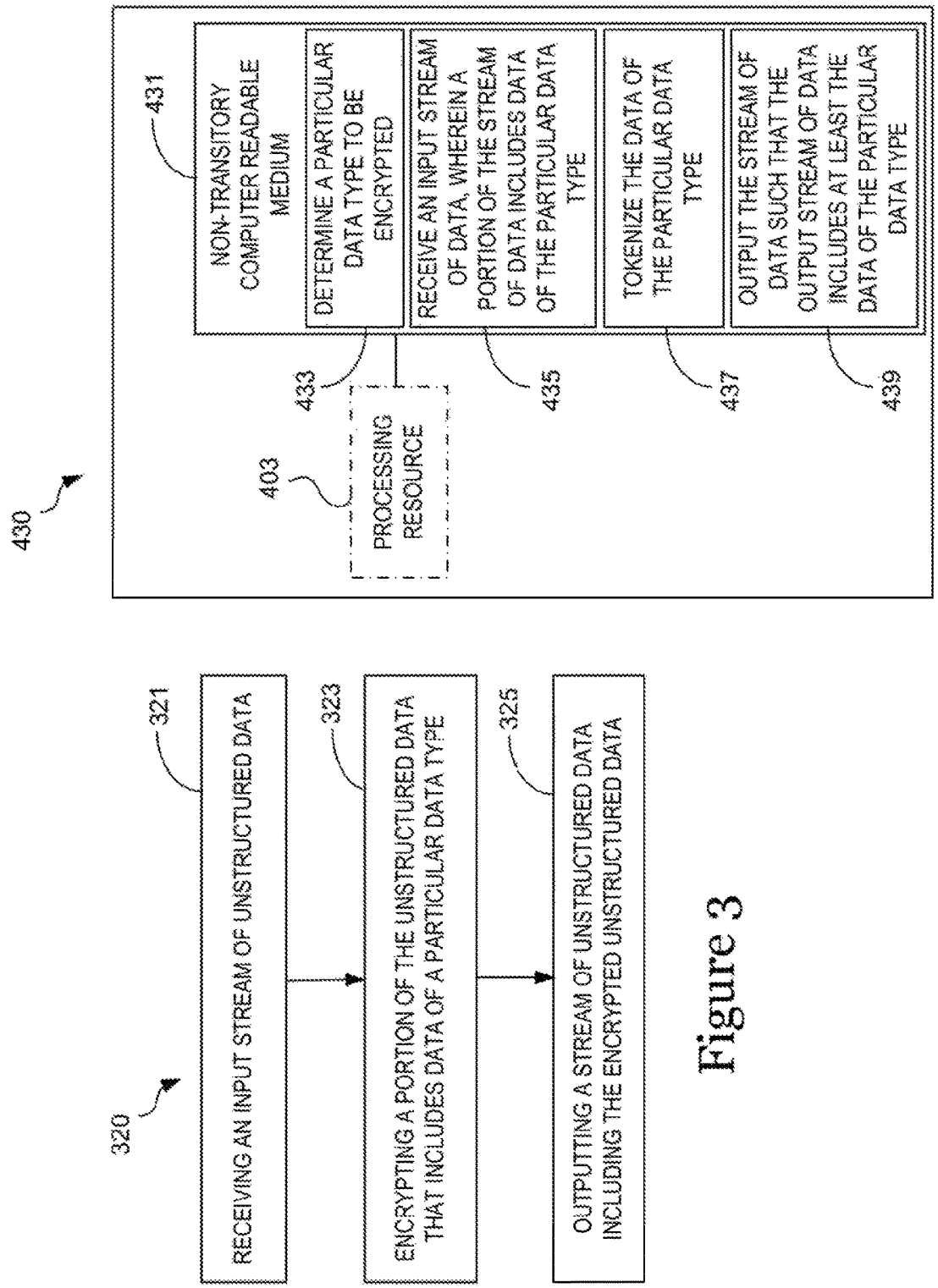

PROTECTING DATA OF A PARTICULAR TYPE

BACKGROUND

At least some portions of data can be sensitive. Sensitive data may be stored in various formats that can include structured and/or unstructured data. Such data may be protected by encryption and/or tokenization.

BRIEF DESCRIPTION OF THE DRAWINGS

FIG. 3 illustrates a flow diagram for an example method for particular data type encryption according to the present disclosure.

FIG. 4 illustrates a diagram of an example system including a processor and non-transitory computer readable medium according to the present disclosure.

DETAILED DESCRIPTION

Figure 1:
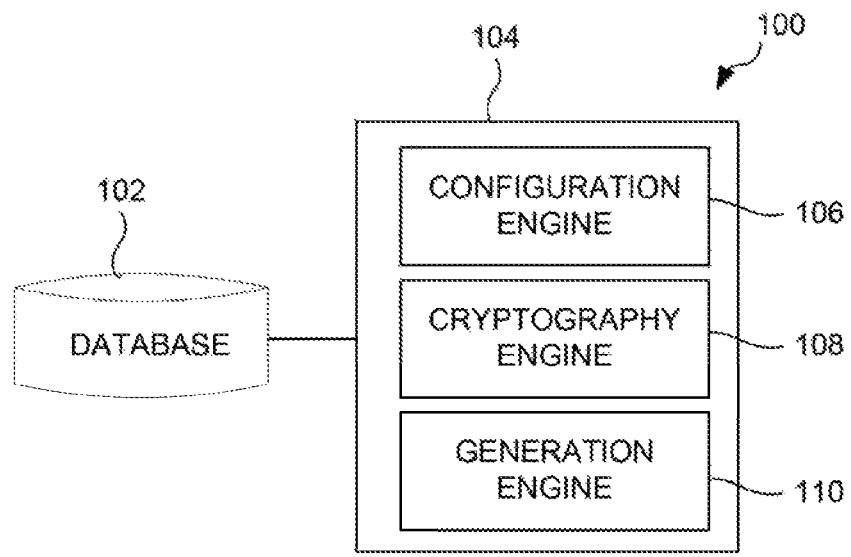
FIG. 1 illustrates a diagram of an example of a system according to the present disclosure.

Encryption and/or tokenization may be used to protect data. Some approaches to protecting data may include the use of file transformation applications and/or application programming interfaces (APIs). For example, one or more file transformation applications and/or APIs may be used to provide for the encryption and or tokenization of data that a user may wish to protect (e.g., sensitive data). However, such approaches may be designed to be used within existing applications. For example, some approaches may allow for a user or users to encrypt and/or tokenize their data if it is stored in databases and/or certain applications, but may not allow for a user or users to encrypt and/or tokenize their data if it is stored in files or if the data is received as part of a stream of data that includes structured and/or unstructured data.

As part of encrypting and/or tokenizing data, some approaches may allow for transformation of files from one format to another format; however, such approaches may require development and/or customization to allow for files from some formats to be transformed into different formats. For example, some approaches may require development and/or customization to facilitate the batching logic utilized by some APIs to allow for transformation of files from one file format to another file format. However, some approaches are unable to support multiple field processing and/or multiple, disparate file formats, and/or data that is presented as stream. In addition to the above described shortcomings, achieving high performance of APIs for protecting data of a particular type may include batch processing, which may increase the complexities associated with protecting data in incumbent file transformation applications. In contrast, examples of the present disclosure may support batch processing and/or multiple field processing while protecting data of a particular type that is presented in a steam of data including structured and/or unstructured data.

Examples of the present disclosure include methods, systems, and computer-readable and executable instructions for protecting data of a particular type. For example, methods, systems, and computer-readable and executable instructions that may support the processing of structured and/or unstructured data within a common framework are described herein. As used herein, "structured data" refers to information that is stored in a fixed field within a file, while "unstructured data" refers to information that either does not have a pre-defined data model or is not organized in a pre-defined manner. In some examples, extensible APIs for particular data type encryption may facilitate encryption and/or tokenization of streamed data.

As used herein, a "particular data type" refers to data having certain predefined characteristics when compared to other data. For example, the particular data type may include certain sensitive data. For example, the particular data type may include credit card numbers, birth dates, social security numbers, etc., while other data in the stream of data includes data that is not sensitive.

FIG. 1 illustrates a diagram of an example of a system according to the present disclosure. As shown in the example of FIG. 1, the system 100 may include a database 102 accessible by and in communication with a plurality of engines 104. The engines 104 may include a configuration engine 106, a cryptography engine 108, and a generation engine 110, etc. The system 100 may include additional or fewer engines than illustrated to perform the various functions described herein and embodiments are not limited to the example shown in FIG. 1.

The system 100 may include hardware, e.g., in the form of transistor logic and/or application specific circuitry (ASICs), firmware, and software, e.g., in the form of machine readable and executable instructions (program instructions (programming) stored in a machine readable medium (MRM)) which in cooperation may form a computing device as discussed in connection with FIG. 2. In some examples, program instructions stored in the hardware may be provided in a class-based, object-oriented computer programming language (e.g., Java). In some examples, the functionality of one or more of the engines 106, 108, 110 may be invoked via a Command Line Tool. Examples of Command Line Tools include Xcode Command Line Tool, HTTPie, Icdiff, Pandoc, etc.

The plurality of engines 104 may include a combination of hardware and software, e.g., program instructions, but at least includes hardware that is configured to perform particular functions, tasks and/or actions. For example, the engines shown in FIG. 1 may be used to receive a stream of data, wherein a portion of the stream of data includes data of a particular data type, determine the particular data type to be protected based, at least in part, on a format associated with the stream of data, protect the data of the particular data type, and output the stream of data such that at least the data of the particular data type is encrypted.

For example, the configuration engine 106 may include hardware and/or a combination of hardware and program instructions to receive a stream of data, wherein a portion of the stream of data includes data of a particular data type. In some examples, the configuration engine 106 may include hardware and or a combination of hardware and program instructions to determine the particular data type in response to a command line tool command. As used herein, a "command line tool" refers to various applications that provide functionality when implemented in a command line interface. The data of the particular data type may be contained in a plurality of fields within the stream of data. In some examples, the received stream of data and the output stream of data are the same format. In at least one example, the configuration engine 106 may store a configuration instruction including a format of the received stream of data and information regarding the determined particular data type.

In some examples, the configuration engine 106 may determine a particular data type in response to receiving a command (e.g., a user command). For example, the command may be an explicit command that defines certain data in the data stream as data of a particular type. For example, the command may be a command that all credit card numbers contained in the data stream are to be classified as data of the particular data type. Embodiments are not so limited; however and the command may be more general. For example, the command may be a command that all unstructured data in the data stream are to be classified as data of the particular type.

In some examples, the configuration engine 106 may receive information regarding what type of format the data in the data stream is. As used herein, "format" and "file format" refer to the way that information is encoded for storage in a computer file. For example, "format" and "file format" specify how bits are used to encode information in a digital storage medium. Some non-limiting examples of formats and file formats include Extensible Markup Language (XML), delimited formats, positional formats, tab-separated value formats, record delimited formats, and/or record positional formats. In addition, various proprietary file formats such as the Microsoft Word Binary File Format (DOC), Excel Binary File Formal (.XLS), Office Open XML, comma-separated values (CSV), Symbolic Link (SYLK), Pages, etc. may be included.

The configuration engine 106 may also be configured store various processing functions. For example, the configuration engine 106 may store information regarding the particular data type, what file format the data in the data stream is in and/or what kind of encryption or tokenization is to be applied to the data. In some examples, this configuration information may be stored in an extensible markup language (XML) configuration file. This configuration file may be passed by reference when the data is processed. In some examples, the configuration engine 106 may provide support for schema-based XML configurations.

In some examples, the configuration engine 106 may facilitate central policy control of the system. For example, the configuration file may be re-usable across a plurality of formats and/or data types such that a user doesn't need to input configuration information to protect multiple file types. For example, if a first file is stored in an XML format, and a second file is stored in a comma separated values (CSV) format, and both files contain data of the particular type, the configuration engine 108 may receive or generate the configuration file such that each format is defined. In this example, the configuration engine 108 may execute the configuration file to locate data of the particular type based on the formats of each of the files. In some examples, the files may be presented as a data stream.

The cryptography engine 108 may include hardware and/or a combination of hardware and program instructions to protect the data of the particular data type. For example, the cryptography engine 108 may protect the data of the particular type by encrypting the data of the particular type, and/or the cryptography engine 108 may protect the data of the particular type by tokenizing the data of the particular type. For example, the cryptography engine 108 may apply cryptographic algorithms to protect the data of the particular type by encrypting or tokenizing the data of the particular type. As used herein, "encryption" refers to the transformation of data through the use of a set of rules or steps defined by a cryptographic algorithm or a set of variable cryptographic keys. As used here, "tokenization" refers to the process of substituting sensitive data (e.g., data of the particular data type) with a non-sensitive token that maps back to the sensitive data through a tokenization system.

In some examples, the cryptography engine 108 may protect data of the particular type by format preserving encryption. As used herein, "format preserving encryption" refers to encrypting data in such a way that the output is in the same format as the input. For example, the cryptography engine 108 may encrypt the data of the particular type such that a format of an input stream of data that includes data of the particular type is the same as a format of the output stream of data that includes the encrypted data of the particular type.

The generation engine 110 may include hardware and/or a combination of hardware and program instructions to output the stream of data such that at least the data of the particular type is protected. In some examples, the generation engine 110 may include hardware and/or a combination of hardware and program instructions to store information regarding the particular data type and a format associated with the input data stream and/or the output data stream. For example, the generation engine 110 may include hardware and/or a combination of hardware and program instructions to store the information regarding the particular data type and the input and/or output data stream format in an extensible markup language configuration file. In some examples, at least one of the configuration engine 106, the cryptography engine 108, and the generation engine 110 may provide multi-threaded processing, as described in more detail, herein.

In some examples, one or more of the engines 106, 108, 110 may operate on an input and output stream of data. As used herein, a "stream of data" refers to a sequence of digitally encoded coherent signals such as packets of data. For example, the configuration engine 106 may be operable to receive data formatted as a stream. As another example, the generation engine 108 may be operable to output data as a stream of data.

One or more of the engines 106, 108, 110 may provide support for stream based processing of large files. For example, one or more of the engines 106, 108, 110 may provide support for multi-gigabyte (multi-GB) files. In some examples, one or more of the engines 106, 108, 110 may provide support for multi-threaded processing of individual files. For example, one or more of the engines 106, 108, 110 may execute multiple processes or threads concurrently. In some examples, providing support for multi-threaded processing of individual files may include providing a multi-core processor either as part of one or more of the engines 106, 108, 110, or may include providing a multi-core processor coupled to one or more of the engines 106, 108, 110.

In some examples, one or more of the engines 106, 108, 110 may use one or more APIs on multiple fields in a file or stream of data. For example, a file or stream of data may contain multiple fields and one or more of the engines 106, 108, 110 may selectively provide functionality from one or more APIs to more than one field in the file or stream of data. In some examples, one or more of the engines 106, 108, 110 may provide batch processing of data contained in the file and/or stream of data such that particular data type encryption or tokenization may be performed with little or no human interaction.

Embodiments are not limited to the example engines shown in FIG. 1 and one or more engines described may be combined or may be a sub-engine of another engine. Further, the engines shown may be remote from one another in a distributed computing environment, cloud computing environment, etc.

Figure 2:
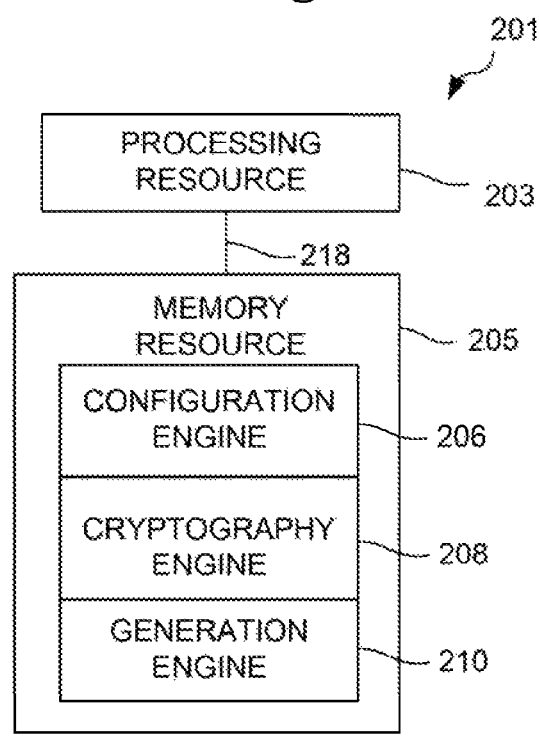
FIG. 2 illustrates a diagram of an example computing device according to the present disclosure.

FIG. 2 illustrates a diagram of an example computing device according to the present disclosure. The computing device 201 may utilize hardware, software (e.g., program instructions), firmware, and/or logic to perform a number of functions described herein. The computing device 201 may be any combination of hardware and program instructions configured to share information. The hardware may, for example, include a processing resource 203 and a memory resource 204 (e.g., computer or machine readable medium (CRM/MRM), database, etc.). A processing resource 203, as used herein, may include one or more processors capable of executing instructions stored by the memory resource 204. The processing resource 203 may be implemented in a single device or distributed across multiple devices. The program instructions (e.g., computer or machine readable instructions (CRI/MRI)) may induce instructions stored on the memory resource 204 and executable by the processing resource 203 to perform a particular function, task and/or action (e.g. receive a stream of data, wherein a portion of the stream of data includes data of a particular data type etc.).

The memory resource 204 may be a non-transitory machine readable medium, include one or more memory components capable of storing instructions that may be executed by a processing resource 203, and may be integrated in a single device or distributed across multiple devices. Further, memory resource 204 may be fully or partially integrated in the same device as processing resource 203 or it may be separate but accessible to that device and processing resource 203. Thus, it is noted that the computing device 201 may be implemented on a participant device, on a server device, on a collection of server devices, and/or a combination of a participant, (e.g., user/consumer endpoint device), and one or more server devices as part of a distributed computing environment, cloud computing environment, etc.

The memory resource 204 may be in communication with the processing resource 203 via a communication link (e.g., a path) 218. The communication link 218 may provide a wired and or wireless connection between the processing resource 203 and the memory resource 204.

In the example of FIG. 2, the memory resource 204 includes a configuration engine 206, a cryptography engine 208, and a generation engine 210. The plurality of engines may be combined or may be sub-engines of other engines. As shown in FIG. 2, the configuration engine 206, the cryptography engine 208, and the generation engine 210 may be individual engines located on one memory resource 204. Embodiments are not so limited, however, and a plurality of engines may be located at separate and distinct memory resource locations, for example, in a distributed computing environment, cloud computing environment, etc.

Each of the plurality of engines may include instructions that when executed by the processing resource 203 may function as an engine such as the engines described in connection with FIG. 1. For example, the configuration engine 206 may include instructions that when executed by the processing resource 203 may function as the configuration engine 106 shown in FIG. 1. The cryptography engine 208 may include instructions that when executed by the processing resource 203 may function as the cryptography engine 108 shown in FIG. 1. Additionally, the generation engine 210 may include instructions that when executed by the processing resource 203 may function as the generation engine 110 shown in FIG. 1.

Embodiments are not limited to the example engines shown in FIG. 2 and in some cases a number of engines may operate together to function as a particular engine. Further, the engines of FIGS. 1 and 2 may be located in a single system and/or computing device or reside in separate distinct locations in a distributed network, cloud computing, enterprise service environment (e.g., Software as a Service (SaaS) environment), etc.

FIG. 3 illustrates a flow diagram for an example method 320 for particular data type encryption according to the present disclosure. In various examples, the method 320 may be performed using the system 100 shown in FIG. 1 and/or the computing device 201 and engines shown in FIG. 2. Examples are not, however, limited to these example systems, devices, and/or engines.

At 321, the method 320 may include receiving an input stream of unstructured data. In various examples, receiving an input stream of data in a first file format may be executed using the receive engine 106 in FIG. 1 and/or the computing device and receive engine 206 in FIG. 2. The method may further include determining a location in the input stream of unstructured data that includes the portion of the unstructured data. For example, the method may include determining the location in the input stream of unstructured data that includes the portion of the unstructured data in response to determining a format associated with the input stream of unstructured data. In another example, the method may include determining the location in the input stream of unstructured data that includes the portion of the unstructured data in response to determining that the portion of the unstructured data is stored in a predetermined field of the unstructured data.

At 323, the method 320 may include encrypting a portion of the unstructured data that includes data of a particular data type. In some examples, encrypting a portion of the unstructured data that includes data of a particular data type may include encrypting, via a processor coupled to a memory, a portion of the unstructured data that includes data of a particular data type. As described in connection with FIGS. 1 and 2, herein, the portion of the unstructured data that includes data of the particular type may be tokenized. In various examples, as described above, encrypting a portion of the unstructured data that includes data of a particular data type may be executed using the cryptography engine 108 and/or the cryptography engine 208, illustrated in FIGS. 1 and 2.

At 325, the method 320 may include outputting a stream of unstructured data including the encrypted unstructured data. The output stream of data may be in the same format as the input stream of data. In some examples, the output stream of data may include the same data as the input stream of data, except that the encrypted or tokenized portion (e.g., the protected data of the particular type) has been altered. In various examples, as described above, outputting a stream of unstructured data including the encrypted unstructured data may be executed using the generation engine 110 and/or the generation engine 210, illustrated in FIGS. 1 and 2.

FIG. 4 illustrates a diagram of an example system 430 including a processing resource 403 and non-transitory computer readable medium 431 according to the present disclosure. For example, the system 430 may be an implementation of the example system of FIG. 1 or the example computing device of FIG. 2.

The processing resource 403 may execute instructions stored on the non-transitory computer readable medium 431. For example, the non-transitory computer-readable medium 431 may be any type of volatile or non-volatile memory or storage, such as random access memory (RAM), flash memory, read-only memory (ROM), storage volumes, a hard disk, or a combination thereof.

The example medium 431 may store instructions 433 executable by the processing resource 403 to determine a particular data type to be encrypted. In addition, the instructions 433 may be executable by the processing resource 403 to determine a particular data type to be encrypted as described in connection with the configuration engine 106 of FIG. 1 and/or the configuration engine 206 of FIG. 2.

The example medium 431 may further store instructions 435. The instructions 435 may be executable to receive an input stream of data, wherein a portion of the stream of data includes data of the particular data type. In addition, the instructions 435 may be executable by the processing resource 403 to receive an input stream of data, wherein a portion of the stream of data includes data of the particular data type as described in connection with the configuration engine 106 of FIG. 1 and/or the configuration engine 206 of FIG. 2.

The example medium 431 may further store instructions 437. The instructions 437 may be executable to tokenize the data of the particular data type. As an example, the instructions 437 may be executable by the processing resource 403 to tokenize the data of the particular data type with the encryption engine 108 of FIG. 1 and/or the encryption engine 208 of FIG. 2.

The example medium 431 may store instructions 439 executable by the processing resource 403 to output the stream of data such that the output stream of data includes at least the data of the particular data type. As an example, the instructions 439 may be executable by the processing resource 403 to output the stream of data such that the output stream of data includes at least the data of the particular data type with the generation engine 108 of FIG. 1 and/or the generation engine 208 of FIG. 2. The example medium 431 may store instructions executable by the processing resource 403 to determine a location in the input stream of data that includes data of the particular data type in response to determining a format associated with the input stream of data. In at least one example, the example medium 431 may store instructions executable by the processing resource 403 to determine a location in the input stream of data that includes data of the particular type in response to determining that the portion of the unstructured data is stored in a predetermined field of the unstructured data.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. For example, reference numeral 102 may refer to element "02" in FIG. 1 and an analogous element may be identified by reference numeral 203 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. Further, as used herein, "a number of" an element and/or feature can refer to one or more of such elements and or features.

As used herein, "logic" is an alternative or additional processing resource to perform a particular action and or function, etc., described herein, which includes hardware, for example, various forms of transistor logic, application specific integrated circuits (ASICs), etc., as opposed to computer executable instructions, for example, software firmware, etc., stored in memory and executable by a processor.

What is claimed:

1. A system, comprising:
 a processing resource; and
 a non-transitory storage medium storing instructions, the instructions executable by the processing resource to:
  receive a stream of unstructured data, wherein a portion of the stream of unstructured data includes an identification string, wherein the identification string comprises a plurality of characters and identifies one selected from a financial account and a person;
  determine a file format of the stream of unstructured data;
  determine a location of the identification string in the stream of unstructured data based on stored configuration information associated with the determined file format, wherein the stored configuration information specifies the location of the identification string in the determined file format;
  protect the identification string in the determined location; and
  output the stream of unstructured data including the protected identification string in the determined location.

2. The system of claim 1, the instructions executable by the processing resource to:
 identify a configuration file associated with the determined file format; and
 read, from the configuration file, the stored configuration information associated with the determined file format,
 wherein the stored configuration information specifies different locations of the identification string in a plurality of file formats.

3. The system of claim 2, wherein the configuration file associated with the determined file format includes information specifying the file format of the stream of unstructured data, information regarding the identification string, and a type of protection to be applied to the identification string.

4. The system of claim 2, wherein the configuration file associated with the determined file format is passed by reference when receiving the stream of unstructured data.

5. The system of claim 1, wherein the received stream of unstructured data and the output stream of unstructured data have a same file format.

6. The system of claim 1, the instructions executable by the processing resource to protect the identification string by encrypting the identification string.

7. The system of claim 1, the instructions executable by the processing resource to protect the identification string by tokenizing the identification string.

8. The system of claim 1, wherein the identification string is a credit card number included in the portion of the stream of unstructured data.

9. A method, comprising:
 receiving, by a computing device, a stream of unstructured data;
 determining, by the computing device, a file format of the stream of unstructured data;

determining, by the computing device, a location of an identification string in the stream of unstructured data based on stored configuration information associated with the determined file format, wherein the stored configuration information specifies the location of the identification string in the determined file format, wherein the identification string comprises a plurality of characters and is a portion of the stream of unstructured data, and wherein the identification string identifies one selected from a financial account and a person;

encrypting, by the computing device, the identification string in the determined location; and outputting, by the computing device, the stream of unstructured data including the encrypted identification string in the determined location.

10. The method of claim 9, comprising:
identifying a configuration file associated with the determined file format; and
reading, from the configuration file, the stored configuration information associated with the determined file format,
wherein the stored configuration information specifies different locations of the identification string in a plurality of file formats.

11. The method of claim 10, wherein the configuration file associated with the determined file format includes information specifying the file format of the stream of unstructured data, information regarding the identification string, and a type of protection to be applied to the identification string.

12. The method of claim 10, comprising:
receiving the configuration file associated with the determined file format by reference when receiving the stream of unstructured data.

13. The method of claim 9, wherein the received stream of unstructured data and the output stream of unstructured data have a same file format.

14. The method of claim 9, wherein the identification string is a birth date included in the portion of the stream of unstructured data.

15. A non-transitory computer readable medium storing instructions executable by a processing resource to:
receive a stream of unstructured data, wherein a portion of the stream of unstructured data includes an identification string, wherein the identification string comprises a plurality of characters and identifies one selected from a financial account and a person;

determine a file format of the stream of unstructured data;

determine a location of the identification string in the stream of unstructured data based on stored configuration information associated with the determined file format, wherein the stored configuration information specifies the location of the identification string in the determined file format;

tokenize the identification string in the determined location; and output the stream of unstructured data including the tokenized identification string in the determined location.

16. The non-transitory computer readable medium of claim 15, wherein the instructions are executable by the processing resource to:
identify a configuration file associated with the determined file format; and
read, from the configuration file, the stored configuration information associated with the determined file format,
wherein the stored configuration information specifies different locations of the identification string in a plurality of file formats.

17. The non-transitory computer readable medium of claim 16, wherein the configuration file associated with the determined file format includes information specifying the file format of the stream of unstructured data, information regarding the identification string, and a type of protection to be applied to the identification string.

18. The non-transitory computer readable medium of claim 16, wherein the configuration file associated with the determined file format is passed by reference when receiving the stream of unstructured data.

19. The non-transitory computer readable medium of claim 15, wherein the received stream of unstructured data and the output stream of unstructured data have a same file format.

20. The non-transitory computer readable medium of claim 15, wherein the identification string is a credit card number included in the portion of the stream of unstructured data.

* * * * *